(12) United States Patent
Huang

(10) Patent No.: US 8,958,839 B2
(45) Date of Patent: Feb. 17, 2015

(54) POWER CONTROL OF CONTROL CHANNELS IN AN LTE SYSTEM

(75) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 617 days.

(21) Appl. No.: 13/318,391

(22) PCT Filed: May 9, 2011

(86) PCT No.: PCT/CN2011/073804
§ 371 (c)(1),
(2), (4) Date: Nov. 1, 2011

(87) PCT Pub. No.: WO2012/151739
PCT Pub. Date: Nov. 15, 2012

(65) Prior Publication Data
US 2012/0289270 A1    Nov. 15, 2012

(51) Int. Cl.
| H04B 7/00 | (2006.01) |
| H04W 52/32 | (2009.01) |
| H04B 17/00 | (2006.01) |
| H04W 52/24 | (2009.01) |

(52) U.S. Cl.
CPC .......... *H04W 52/325* (2013.01); *H04B 17/009* (2013.01); *H04W 52/242* (2013.01)
USPC .......... 455/522; 455/69; 455/135; 455/277.2

(58) Field of Classification Search
CPC . H04W 52/242; H04W 52/325; H04B 17/009
USPC .............. 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| 2005/0037796 A1* | 2/2005 | Tsai et al. .................... 455/522 |
| 2009/0010359 A1* | 1/2009 | Hwang et al. ................ 375/297 |
| 2009/0088148 A1 | 4/2009 | Chung et al. |
| 2009/0290570 A1* | 11/2009 | Kishiyama et al. .......... 370/344 |
| 2010/0034114 A1* | 2/2010 | Kim et al. .................... 370/252 |
| 2010/0069111 A1 | 3/2010 | Senba |

(Continued)

FOREIGN PATENT DOCUMENTS

| CN | 101809898 A | 8/2010 |
| CN | 101895936 A | 11/2010 |

(Continued)

OTHER PUBLICATIONS

3GPP TS 36.211 "3rd Generation Partnership Project; Technical Specification Group Radio Access Network; Evolved Universal Terrestrial Radio Access (E-UTRA); Physical Channels and Modulation", Mar. 2010.

(Continued)

*Primary Examiner* — Dominic E Rego
(74) *Attorney, Agent, or Firm* — Maschoff Brennan

(57) ABSTRACT

In some examples, a method for power control of control channels in a radio communication system is described. The method may include transmitting, with a first transmission power, first scheduling data in a common search space of a PDCCH. The method may also include transmitting, with a second transmission power, second scheduling data in a specific search space of the PDCCH.

24 Claims, 8 Drawing Sheets

(56) References Cited

U.S. PATENT DOCUMENTS

2010/0331030 A1* 12/2010 Nory et al. ............... 455/509
2011/0075679 A1* 3/2011 Yui ............... 370/412
2011/0141928 A1* 6/2011 Shin et al. ............... 370/252
2011/0143806 A1* 6/2011 Song et al. ............... 455/522
2011/0250919 A1* 10/2011 Barbieri et al. ............... 455/509
2014/0153549 A1* 6/2014 Damnjanovic et al. ....... 370/335

FOREIGN PATENT DOCUMENTS

| CN | 102035772 A | 4/2011 |
|----|----|----|
| JP | 2007221753 A | 8/2007 |
| WO | 03/036815 A1 | 5/2003 |
| WO | 2010/025270 | 3/2010 |
| WO | 2010/050704 | 5/2010 |
| WO | 2010053145 A1 | 5/2010 |
| WO | 2010/112085 A1 | 10/2010 |
| WO | 2010124249 A1 | 10/2010 |

OTHER PUBLICATIONS

3GPP TS 36.213 "3rd Generation Partnership Project; Technical Specification Group Radio Access Network; Evolved Universal Terrestrial Radio Access (E-UTRA); Physical layer procedures", Mar. 2008.
3GPP TSG-RAN WG! Meeting #53 "Testing and CQI" Panasonic, May 5-9, 2008.
3GPP TSG-RAN WG1 Meeting #51bis "Performances of PDCCH interleaver" Huawei, Jan. 14-18, 2008.
Extended European Search Report dated Dec. 9, 2014 in application No. EP 11 86 4927.

* cited by examiner

POWER CONTROL OF CONTROL CHANNELS IN AN LTE SYSTEM

BACKGROUND

Unless otherwise indicated herein, the materials described herein are not prior art to the claims in the present application and are not admitted to be prior art by inclusion in this section.

At present, base stations in some radio communication systems typically transmit scheduling information on a Physical Downlink Control Channel (PDCCH) to User Equipment (UE) within cells serviced by the respective base stations. Each base station transmits the same power on each PDCCH, which may result in PDCCH interference between neighboring cells. The PDCCH interference can interfere with the ability of UEs to correctly decode the scheduling information on the PDCCH, which may adversely affect the switching success of UEs near cell peripheries and/or may otherwise reduce system performance.

SUMMARY

Techniques described herein generally relate to power control of a control channel in a radio communication system.

In some examples, a method for power control of control channels in a radio communication system is described. The method may include transmitting, with a first transmission power, first scheduling data in a common search space of a PDCCH. The method may also include transmitting, with a second transmission power, second scheduling data in a specific search space of the PDCCH.

In some examples, a computer-readable storage medium having computer-executable instructions stored thereon that are executable by a computing device to perform operations is described. The operations can include determining, at a base station prior to transmission, a magnitude of a first transmission power for transmitting first scheduling data in a common search space of a PDCCH. The operations can also include independently determining, at the base station prior to transmission, a magnitude of a second transmission power for transmitting second scheduling data in a specific search space of the PDCCH that is associated with a specific UE.

In some examples, a base station is described that includes at least one transmitter, a computing device, and a computer-readable storage medium having computer-executable instructions stored thereon that are executable by a computing device to perform operations. The operations can include determining, prior to transmission using the at least one transmitter, a magnitude of a first transmission power for transmitting first scheduling data in a common search space of a PDCCH. The operations can also include independently determining, prior to transmission using the at least one transmitter, a magnitude of a second transmission power for transmitting second scheduling data in a specific search space of the PDCCH that is associated with a specific UE.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
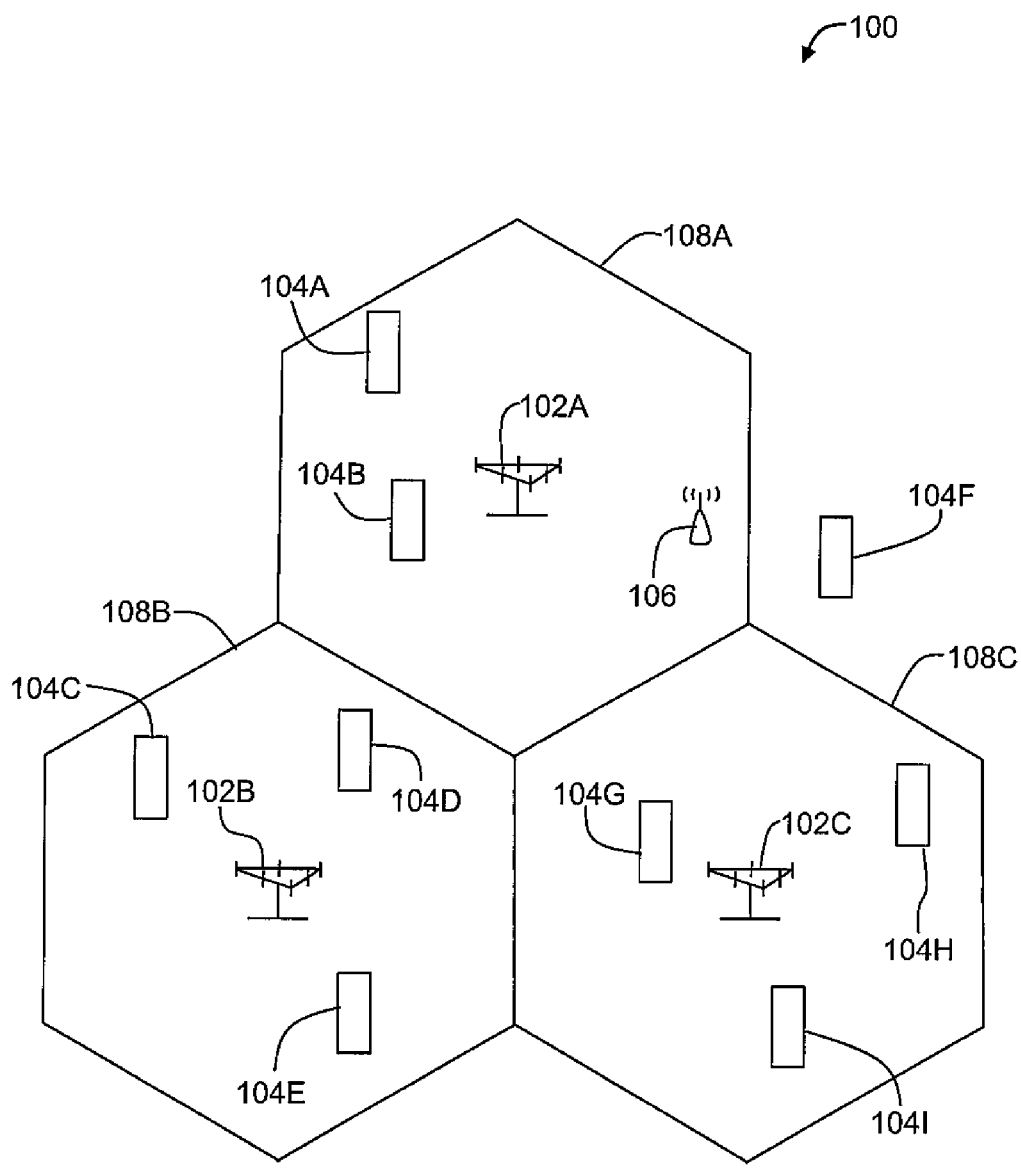
FIG. 1 is a diagram of a radio communication system including one or more base stations and one or more UEs.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments disclosed herein generally relate to power control of a control channel in a radio communication system, such as an LTE system including multiple cells. Generally, for example, a transmission power of UE-specific data in a control channel can be controlled independently from other data in the control channel to reduce and/or avoid interference between neighboring cells.

In some embodiments, the other data is transmitted in a common search space of a PDCCH, while the UE-specific data is transmitted in a specific search space of the PDCCH. The data in the common search space of the PDCCH may be transmitted with a first transmission power, while the data in the specific search space of the PDCCH may be transmitted with a second, independently-controlled transmission power.

The transmission power for the data in the specific search space may be determined based on an indicator associated with a communication channel between the base station and the UE. For instance, the determination may be based on a Channel Quality Indicator (CQI) received by the base station from the UE. When the CQI is relatively high indicating that the channel quality between the base station and the UE is relatively good, a relatively low transmission power may be selected for the specific search space of the PDCCH while still permitting the UE to receive and properly decode the specific search space of the PDCCH. In contrast, when the CQI is relatively low indicating that the channel quality between the base station and the UE is relatively poor, a relatively high transmission power may be selected for the specific search space of the PDCCH to compensate for the relatively poor channel quality. The control of the transmission power of the specific search space of the PDCCH may thereby reduce PDCCH interference between neighboring cells, as the transmission power is only selected to be relatively high as needed.

The techniques described herein may be used for various radio communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM(R), etc. UTRA and E-UTRA are part of Universal Mobile Telecommunication System (UMTS).

3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). Certain embodiments are described below for LTE, and LTE terminology may be used below. However, the principles of the disclosed embodiments are not limited to LTE networks.

FIG. 1 is a diagram of a radio communication system 100 including one or more base stations 102A-102C (collectively "base stations 102") and one or more user equipment (UE) 104A-104I (collectively "UEs 104"), arranged in accordance with at least some embodiments described herein. Optionally, the radio communication system 100 may further include one or more relay nodes 106.

Each of the base stations 102 may include, but is not limited to, a base transceiver station (BST), a Node B (NB), an evolved Node B (eNB), or the like or any combination thereof. In the illustrated embodiment, each of the base stations 102 is implemented as a macro base station in a respective macro cell 108A-108C (collectively "macro cells 108") and may be configured to service UEs 104 within the respective macro cell 108. While not shown for simplicity, the macro cells 108 may overlap at the edges and/or may have different shapes than the generally hexagonal shapes shown in FIG. 1. Further, and although not shown, the radio communication system 100 may optionally include one or more pico base stations for one or more respective pica cells, one or more femto base stations for one or more femto cells, or the like.

The UEs 104 are generally configured to wirelessly communicate with the base stations 102 and/or relay node 106 and may alternately or additionally be referred to as terminals, access terminals (ATs), mobile stations (MS), subscriber units, or the like. In some embodiments, each UE 104 may include, but is not limited to, a mobile phone, a smartphone, a laptop computer, or the like or any combination thereof.

In general, the relay node 106 may be configured to receive a transmission of data from an upstream station, e.g., from the base station 102A, and to send a transmission of data to a downstream station, e.g., to the UE 104F.

In some embodiments, user traffic data, system information and system high layer signaling are all transmitted on shared channels. In particular, all UEs 104 within a given macro cell 108 may share system resources in a manner that at each scheduling time, the corresponding base station 102 allocates the shared resources to the UEs 104 within the corresponding macro cell 108. After completing a shared resource allocation strategy, a base station 102 may transmit relevant scheduling information on a Physical Downlink Control Channel (PDCCH) to scheduled UEs 104. The scheduling information may include, but is not limited to, a location of frequency resources for the scheduled UEs 104, size of allocated resource blocks, adopted modulation and coding modes, and the like or any combination thereof.

After a UE 104 receives the PDCCH and correctly decodes scheduling information loaded on the PDCCH, the UE 104 may be able to receive user traffic data on a downlink traffic channel, or send uplink traffic data on an uplink shared traffic channel. If the UE 104 cannot correctly receive the scheduling information on the PDCCH, the UE 104 may not be able to receive or send user traffic data on the corresponding traffic channel. Thus, if the performance of the PDCCH cannot be guaranteed, system resources may be wasted and/or Quality of Service (QoS) for users of UEs 104 may be unsatisfactory.

Generally, the higher the transmit power of the PDCCH, the higher the likelihood that the UE 104 will be able to correctly receive the scheduling information on the PDCCH. However, if the transmit power of the PDCCH is too high, the PDCCH can interfere with the PDCCH in a neighboring macro cell 108. For instance, if the transmit power of the PDCCH transmitted by base station 102A is too high, it can interfere with the PDCCH transmitted by base station 102B, such as at the UE 104D in macro cell 108B.

Co-channel interference between PDCCHs of neighboring macro cells 108 may limit successful PDCCH decoding in some embodiments. Consider the UE 104D within macro cell 108B. If the UE 104D is approaching the periphery of macro cell 108B, the UE 104D may prepare for switching from communication with base station 102B in macro cell 108B to communication with base station 102A in macro cell 108A. Because the switching is carried out in the periphery of the macro cell 108B, if the transmit power of the PDCCH from the base station 102A is too high, the PDCCH from the base station 102A may interfere with the PDCCH from the base station 102B prior to completion of the switch, making it difficult or impossible for the UE 104D to correctly decode the PDCCH from base station 102B. As such, and in general, co-channel interference between PDCCHs of neighboring macro cells 108 may limit the ability of UEs 104 near the periphery of macro cells 108 to correctly decode the scheduling information on the corresponding PDCCH, which may affect the switching success rate of UEs 104 leaving one macro cell 108 and entering another.

Accordingly, some embodiments described herein relate to power control of a control channel such as the PDCCH. In these and other embodiments, a transmit power of a specific search space of the PDCCH may be controlled independent of a transmit power of a common search space of the PDCCH. Prior to describing these and other embodiments in more detail, an example base station and UE will be first be described with respect to FIG. 2, and various aspects of the LTE radio technology will then be described with respect to FIGS. 3-7B. Various example methods relating to power control of a control channel with then be described with respect to FIGS. 8A-9.

Figure 2:
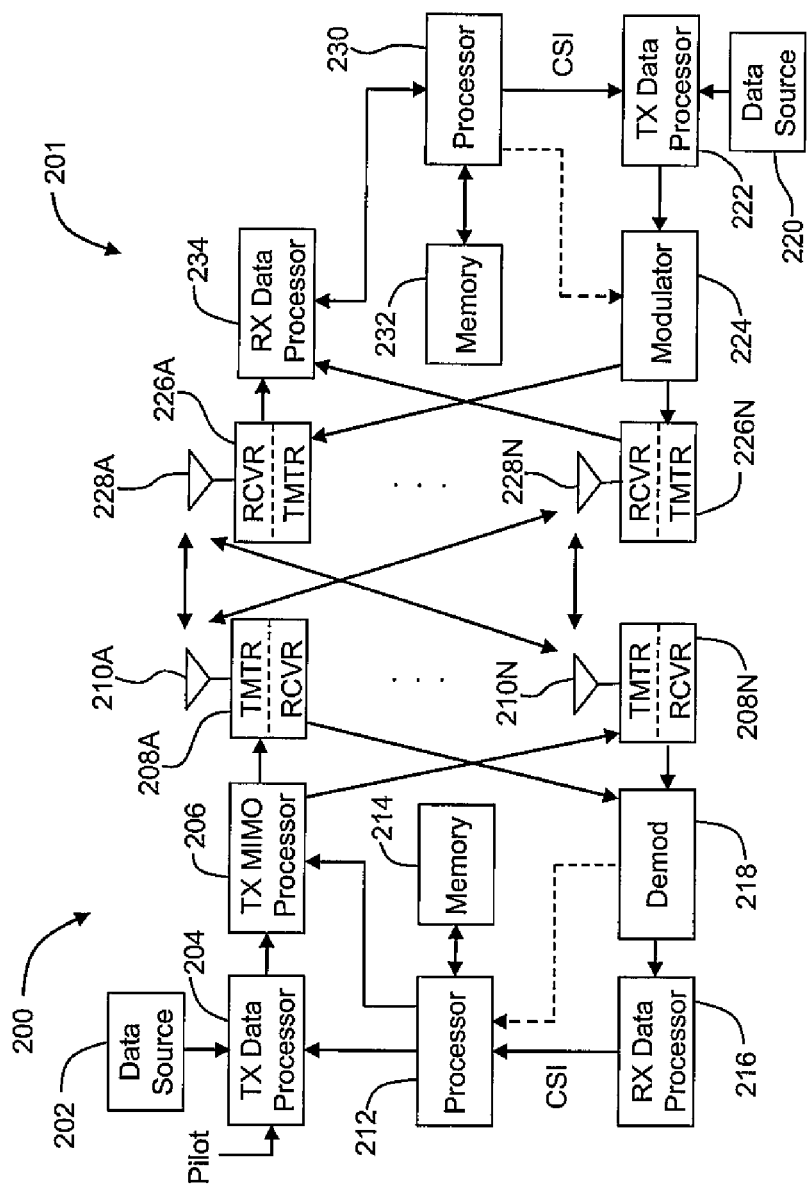
FIG. 2 is a block diagram of an example base station and UE.

FIG. 2 is a block diagram of an example base station 200 and UE 201, arranged in accordance with at least some embodiments described herein. The base station 200 of FIG. 2 may correspond to any one of the base stations 102 of FIG. 1. Alternately or additionally, the UE 201 may correspond to any one of the UEs 104 of FIG. 1.

In the illustrated embodiment, the base station 200 may include, for example, a data source 202, a transmit (TX) data processor 204, a TX multiple input multiple output (MIMO) processor 206, one or more transceivers 208A-208N, one or more antennas 210A-210N, a processor 212, a memory or other computer-readable storage medium 214, a receive (RX) data processor 216, and a demodulator (Demod) 218. Each of the transceivers 208A-208N may include a transmitter (TMTR) and a receiver (RCVR).

Alternately or additionally, the UE 201 may include, for example, a data source 220, a TX data processor 222, a modulator 224, one or more transceivers 226A-226N, one or more antennas 228A-228N, a processor 230, a memory or other computer-readable storage medium 232, and an RX data processor 234. Each of the transceivers 226A-226N may include a transmitter (TMTR) and a receiver (RCVR).

An example embodiment of operation of the components of the base station 200 and the UE 201 that are depicted in FIG. 2 will now be described. At the base station 200, traffic data for a number of data streams may be provided from the data source 202 to the TX data processor 204. The TX data processor 204 may format, code, and interleave the traffic data for each data stream based on a particular coding scheme selected for that data stream to provide coded data.

The coded data for each data stream may be multiplexed with pilot data using OFDM techniques. The pilot data may include a known data pattern that is processed in a known manner and that may be used at a receiver system to estimate channel response. The multiplexed pilot and coded data for each data stream may then be modulated (i.e., symbol mapped) based on a particular modulation scheme (e.g., BPSK, QSPK, M-PSK, or M-QAM) selected for that data stream to provide modulation symbols.

The data rate, coding, and modulation for each data stream may be determined by the processor 212 executing computer-executable instructions stored on the memory 214. Alternately or additionally, the processor 212 may execute computer-executable instructions stored on the memory 214 or other location that are effective to cause the base station 200 to perform one or more of the other operations described herein, such as one or more of the operations described with respect to FIGS. 8A-9 below. The memory 214 may store computer-executable instructions such as program code, as well as data, and/or other information used by the processor 212 or other components of the base station 200.

The modulation symbols for all data streams may then be provided to the TX MIMO processor 206, which may further process the modulation symbols (e.g., for OFDM). The TX MIMO processor 206 may then provide modulation symbol streams to transceivers 208A-208N. In some embodiments, the TX MIMO processor 206 may apply beam-forming weights to the symbols of the data streams and/or to the antenna 210A-210N from which the symbol is being transmitted.

Each transceiver 208A-208N may receive and process a respective symbol stream to provide one or more analog signals, and may further condition (e.g., amplify, filter, and/or up convert) the analog signals to provide a modulated signal suitable for transmission over the MIMO channel. Modulated signals from transceivers 208A-208N are then transmitted from antennas 210A-210N, respectively.

At the UE 201, the transmitted modulated signals may be received by antennas 228A-228N and the received signal from each antenna 228A-228N may be provided to a respective transceiver 226A-226N. Each transceiver 226A-226N may condition (e.g., filter, amplify, and/or downconvert) a respective received signal, digitize the conditioned signal to provide samples, and further process the samples to provide a corresponding "received" symbol stream.

The RX data processor 234 may then receive and process the received symbol streams from the transceivers 226A-226N based on a particular receiver processing technique to provide "detected" symbol streams. The RX data processor 234 may then demodulate, deinterleave, and decode each detected symbol stream to recover the traffic data for the data stream. The processing by the RX data processor 234 may be complementary to that performed by the TX MIMO processor 206 and the TX data processor 204 at the base station 200.

The processor 230 may periodically determine which precoding matrix to use. The processor 230 may formulate a reverse link message comprising a matrix index portion and a rank value portion. Alternately or additionally, the processor 230 may execute computer-executable instructions stored on the memory 232 or other location that are effective to cause the UE 201 to perform one or more of the operations described herein. The memory 232 may store computer executable instructions such as program code, as well as data and/or other information used by the processor 212 or other components of the UE 201.

Reverse link messages may be generated by the UE 201 and may include various types of information regarding the communication link between the UE 201 and the base station 200, and/or regarding the received data stream. For instance, reverse link messages may include a Channel Quality Indicator (CQI). Reverse link messages may be processed by the TX data processor 222, which may also receive traffic data for one or more data streams from the data source 220, modulated by the modulator 224, conditioned by the transceivers 226A-226N, and transmitted back to the base station 200.

At the base station 200, the modulated signals from the UE 201 may be received by the antennas 210A-210N, conditioned by the transceivers 208A-208N, demodulated by the demodulator 218, and processed by the RX data processor 216 to extract reverse link messages transmitted by the UE 201. The processor 212 may then determine which pre-coding matrix to use for determining the beam-forming weights and/or may then process the extracted message.

Figure 3:
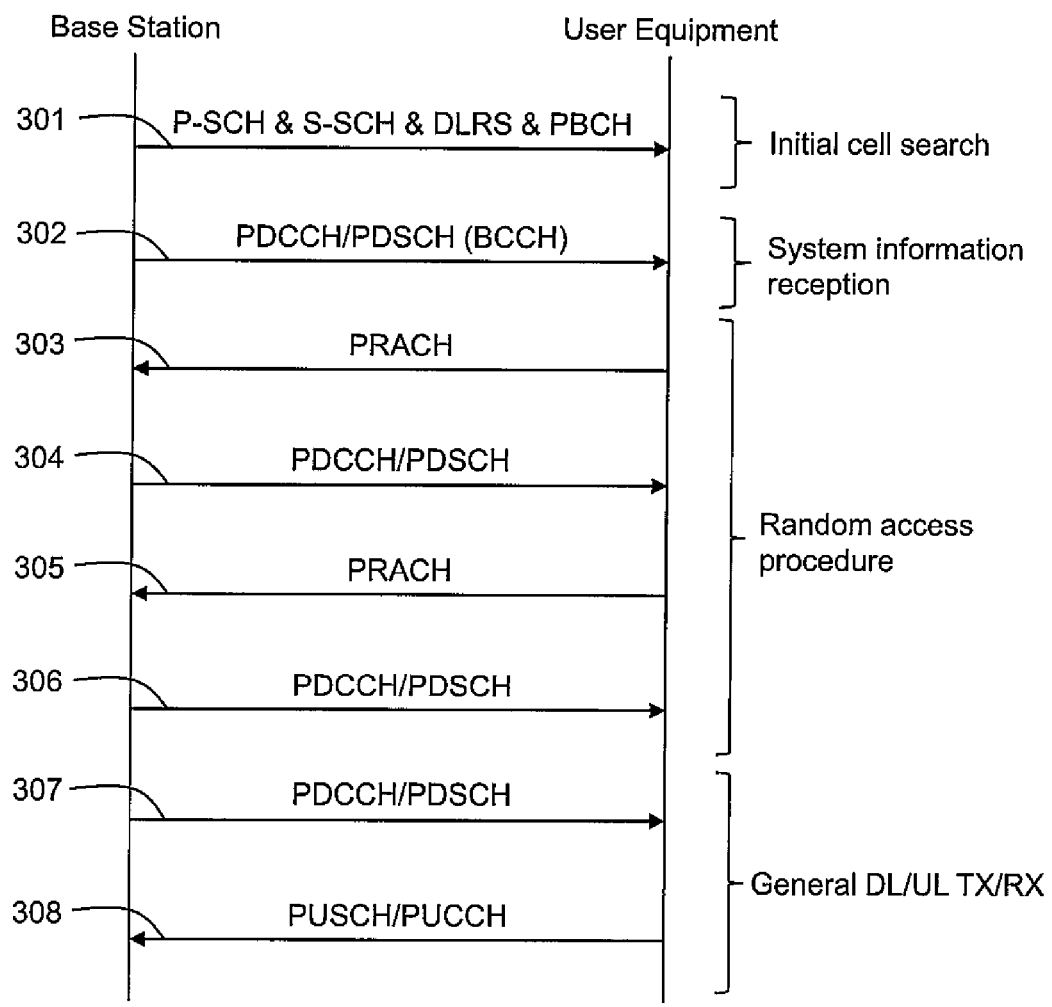
FIG. 3 depicts some example communication flows between a base station and a UE.

Various aspects of the LTE radio technology will now be described with respect to FIGS. 3-7B. FIG. 3 depicts some example communication flows 301-308 between a base station and a UE, arranged in accordance with at least some embodiments described herein. The communication flows 301-308 may be representative of some communication flows that may occur in a radio communication system implementing LTE radio technology. In FIG. 3, the base station may correspond to one of the base stations 102 of FIG. 1 and/or the base station 200 of FIG. 2, while the UE may correspond to one of the UEs 104 of FIG. 1 and/or the UE 201 of FIG. 2.

The UE may perform an initial cell search operation such as synchronization with the base station when the UE is powered on or when the UE enters a new cell, such as one of the macro cells 108 of FIG. 1. During the initial cell search, the UE may receive a Primary Synchronization Channel (P-SCH) and a Secondary Synchronization Channel (S-SCH) from the base station, perform synchronization with the base station, and acquire information such as a cell ID. Thereafter, the UE may receive a physical broadcast channel (PBCH) from the base station so as to acquire broadcast information within the cell. The UE may also receive a Downlink Reference Signal (DLRS) to confirm a downlink channel state in the initial cell search step. The transmission of the P-SCH, S-SCH, DLRS and PBCH to the UE is depicted at communication flow 301.

After completion of the initial cell search, the UE may acquire more detailed system information. In particular, the UE may receive a PDCCH and a Physical Downlink Shared Channel (PDSCH) according to information included in the PDCCH. The transmission of the PDCCH and PDSCH to the UE is depicted at communication flow 302.

Meanwhile, if the base station is being initially accessed or radio resources for signal transmission are not present, the UE may perform a Random Access Procedure (RACH) with respect to the base station that may involve the transmission and reception of certain data over various channels depicted at communication flows 303-306. For example, the UE may transmit a specific sequence through a Physical Random Access Channel (PRACH) as a preamble at communication flows 303 and/or 305, and receive a response message of the preamble through the PDCCH and the PDSCH corresponding thereto at communication flows 304 and/or 306. Although not shown, in the case of contention-based RACH, a contention resolution procedure may be further performed.

After completion of the RACH, the UE may perform general downlink (DL) and uplink (UL) transmission and reception via the PDCCH and PDSCH depicted at communication flow 307, and/or via a Physical Uplink Shared Channel (PUSCH) and Physical Uplink Control Channel (PUCCH) depicted at communication flow 308. The control information transmitted from the UE to the base station in the uplink or transmitted from the base station to the UE in the downlink may include, but is not limited to, a downlink/uplink acknowledgment (ACK) or negative ACK (HACK), a CQI, a Precoding Matrix Index (PMI) a Rank Indicator (RI), or the like or any combination thereof. In the case of the 3GPP LTE system, the UE may transmit the control information such as CQI/PMI/RI through the PUSCH and/or the PUCCH.

Figure 4:
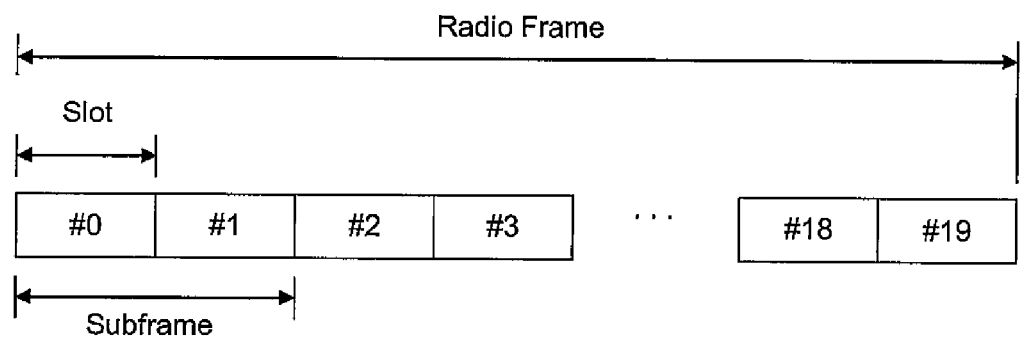
FIG. 4 is a schematic diagram of an example radio frame such as may be implemented in a Long Term Evolution (LTE) nework.

FIG. 4 is a schematic diagram of an example radio frame such as may be implemented in an LTE network, arranged in accordance with at least some embodiments described herein. The radio frame has ten subframes of equal length. Each subframe has two slots. In the 3GPP LTE system, the subframe is defined as the basic time unit of packet scheduling with respect to an overall downlink frequency.

The radio frame has a length of 1.0 milliseconds (ms). Each subframe has a length of 1 ms. Each slot has a length of 0.5 ms. Each slot includes multiple OFDM symbols in a time domain, and multiple resource blocks (RBs) in a frequency domain. A Transmission Time Interval (TTI) which is a unit time for transmission of data may be determined in units of one or more subframes. The architecture of the radio frame of FIG. 4 is provided by way of example only and the number of subframes included in the radio frame, the number of slots included in the subframe, the number of OFDM symbols included in the slot, and/or the lengths of the radio frame, subframe and/or slot may be variously changed.

Figure 5:
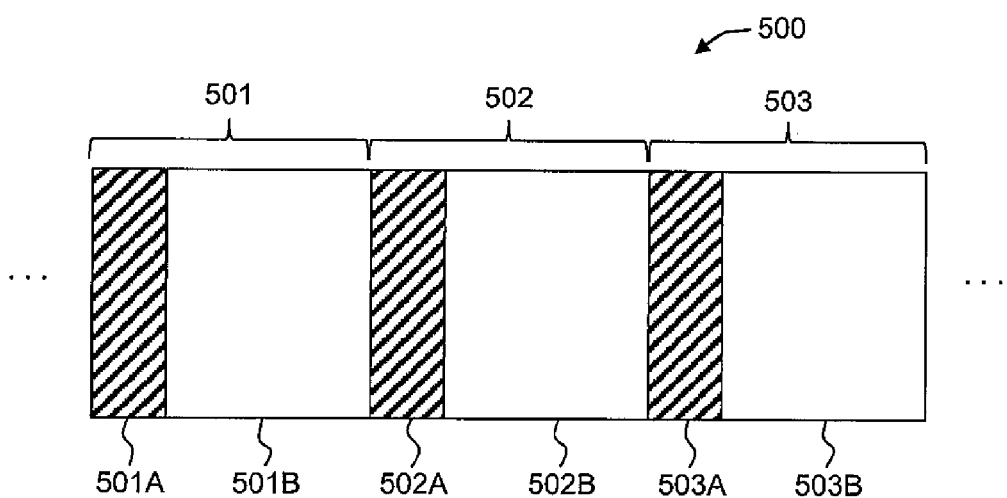
FIG. 5 is a schematic diagram of the radio frame of FIG. 4 implemented as a downlink radio frame and including multiple subframes.

FIG. 5 is a schematic diagram of the radio frame of FIG. 4 implemented as a downlink radio frame 500 and including multiple subframes 501, 502, 503, arranged in accordance with at least some embodiments described herein. Although only three subframes 501-503 are depicted in FIG. 5, the downlink radio frame 500 may include ten subframes, or some other number of subframes.

In the illustrated embodiment of FIG. 5, each subframe 501-503 is divided into a control region 501A, 502A, 503A and a data region 501B, 502B, 503B, respectively. Each control region 501A, 502A, 503A is a time interval for transmission of scheduling information and other control information. Each data region 501B, 502B, 503B is a time interval for transmission of downlink data. The control regions 501A, 502A, 503A each start from a first OFDM symbol of the respective subframe 501-503 and each include one or more OFDM symbols. The size of the control region 501A, 502A, 503A may be independently set for each subframe 501-503.

Figure 6:
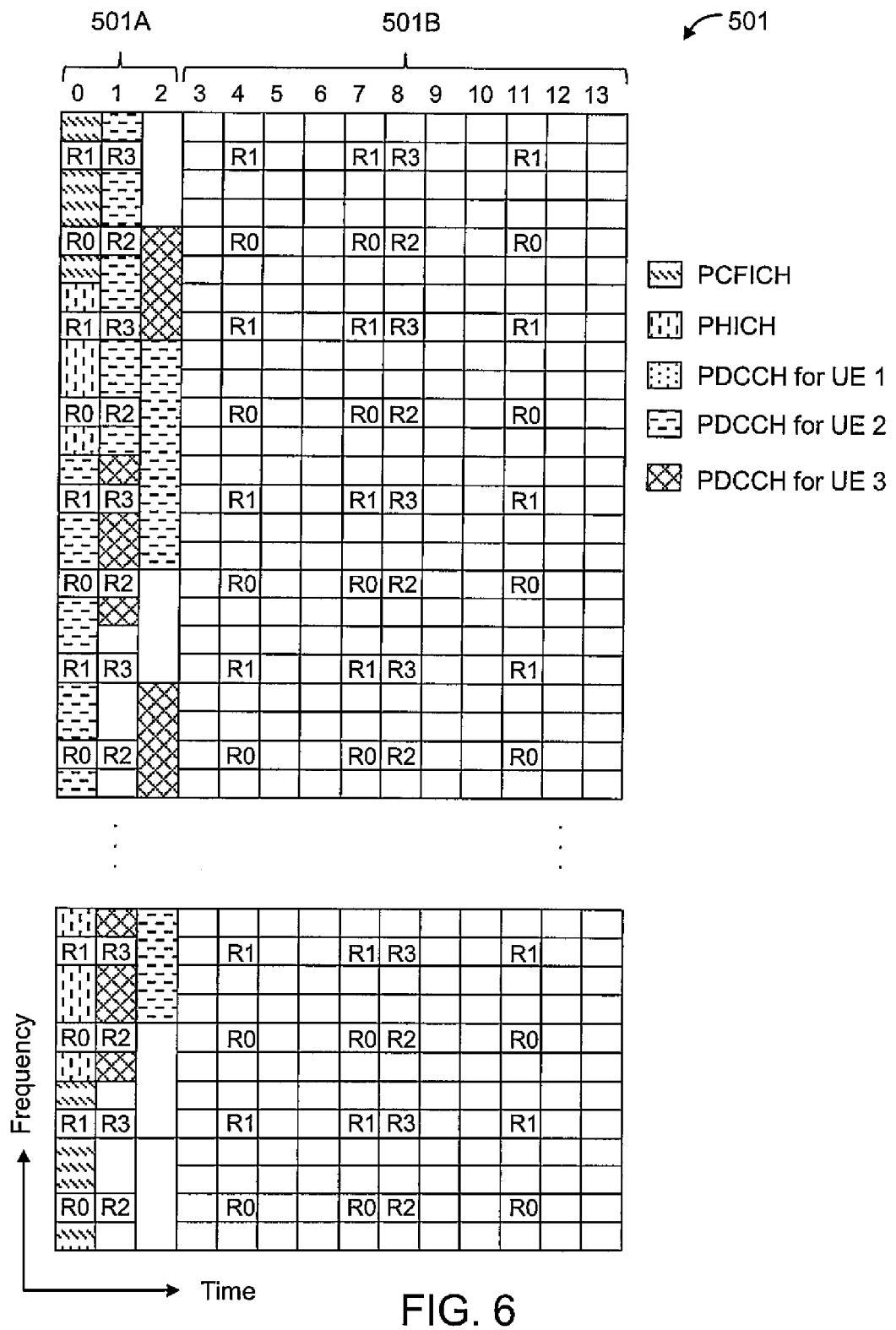
FIG. 6 depicts a control channel that may be included in a control region 501A of one of the subframes of FIG. 5.

FIG. 6 depicts control channels that may be included in a control region 501A of one of the subframes 501 of FIG. 5, arranged in accordance with at least some embodiments. In FIG. 6, the subframe 501 includes 14 OFDM symbols, labeled 0, 1, 2, ..., 13. The first one to three OFDM symbols are included in the control region 501A and the remaining thirteen to eleven OFDM symbols are included in the data region 501B. In FIG. 6, R0, R1, R2 and R3 denote Reference Signals (RS), or pilot signals of corresponding antennas 0, 1, 2 and 3 (not shown). The RS may be fixed within the subframe 501 with a constant pattern regardless of the control region 501A and data region 501B.

Control channels are resources in the control region 501A to which the RSs are not allocated. Analogously, traffic channels are resources in the data region 501B to which the RSs are not allocated. The control channels may include a Physical Control Format Indicator Channel (PCFICH), a Physical Hybrid-ARQ Indicator Channel (PHICH), one or more PDCCHs, and the like or any combination thereof.

The PCFICH informs the UE of the number of OFDM symbols used in the PDCCH for each subframe. The PCFICH is located at a first OFDM symbol and is set prior to the PHICH and the PDCCH. The PCFICH is composed of four Resource Element Groups (REGs), and the REGs are distributed within the control region based on a cell Identity (ID). One REG is composed of four Resource Elements (REs). The RE refers to a minimum physical resource defined by one subcarrier times one OFDM symbol. An example architecture of a REG is described with respect to FIG. 7 below. The PCFICH value may indicate a value of one to three or two to four according to a bandwidth and may be modulated suing a QPSK scheme.

The PHICH is used to transfer a Hybrid Automatic Repeat and reQuest (HARQ) ACK/NACK signal linked to uplink transmission. That is, the PHICH refers to a channel used for transmitting DL ACK/NACK information for UL HARQ. The PHICH is composed of one REG and is scrambled on a cell-specific basis. The ACK/NACK signal is indicated by 1 bit and is modulated using a BPSK scheme. The modulated ACK/NACK signal is spread using a Spreading Factor (SF) of two or four. Multiple PHICHs mapped to the same resources configures a PHICH group. The number of PHICHs multiplexed in the PHICH group is determined according to the number of spreading codes. The PHICH (group) is repeated three times in order to obtain a diversity gain in a frequency domain and/or a time domain.

The PDCCH is allocated to first n OFDM symbols of the subframe. Here, n is an integer of one or more and is indicated by the PCFICH. The PDCCH is composed of one or more Control Channel Elements (CCEs), which are described below. The PDCCH informs UEs or a UE group of information associated with resource allocation of a Paging Channel (PCH) and a Downlink-Shared Channel (DL-SCH) of a transport channel, Uplink scheduling grant, HARQ information, or the like. The PCH and the DL-SCH are transmitted through the PDSCH. Accordingly, the base station and the UE may generally transmit and receive data through the PDSCH except for specific control information or specific service data.

Information indicating to which UE (one or multiple UEs) the data of the PDSCH is transmitted and how UEs receive and decode the data of the PDSCH is transmitted through the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, etc.) "C" is transmitted via a specific subframe. In this case, a UE located within a cell monitors PDCCH using is own RNTI information, and if one or more LTEs having "A" RNTI are present, the UEs receive the PDCCH and receive the PDSCH indicated by "B" and "C" through the information about the received PDCCH.

Figure 7A:
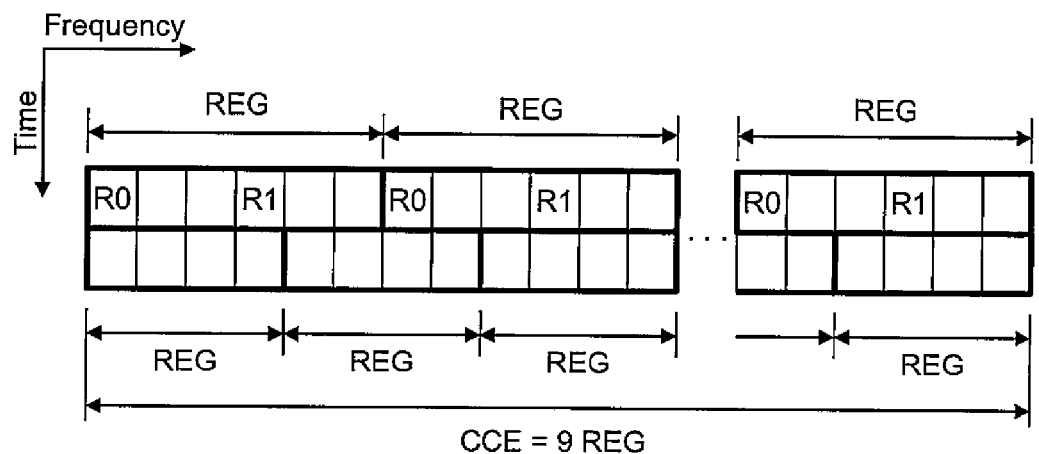
FIGS. 7A and 7B schematically depict a resource unit for configuring a control channel.
Figure 7B:
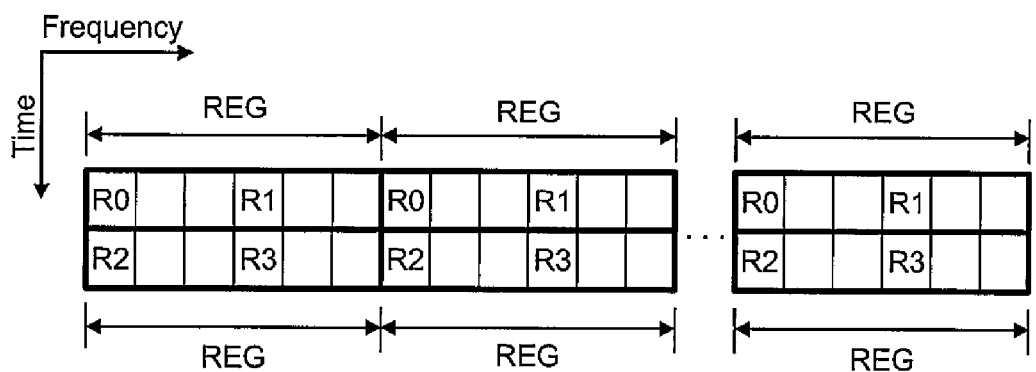

FIGS. 7A and 7B schematically depict a resource unit for configuring a control channel, arranged in accordance with at least some embodiments described herein. FIG. 7A depicts an example where the number of transmission antennas is 1 or 2 and FIG. 7B depicts an example where the number of transmission antennas is 4, which are different from each other in only an RS pattern according to the number of transmission antennas, but are equal to each other in a method of setting a resource unit associated with the control channel.

Referring to FIGS. 7A and 7B, a REG which is the basic resource unit of the control channel is composed of four neighbor REs in a state of excluding the RS. Each REG is denoted by a relatively thick outline in FIGS. 7A-7B. The PCFICH and the PHICH include four REGs and three REGs, respectively. The PDCCH is composed of CCE units and one CCE includes 9 REGs.

The UE may be set to confirm that the number of PDCCH candidates, $M^{(L)}$, is greater than or equal to L CCEs which are arranged consecutively or according to a specific rule in order to determine whether a PDCCH composed of L CCEs is transmitted to the UE. The value L considered when the UE receives the PDCCH may be plural. A set of CCEs which should be confirmed when the UE receives the PDCCH is referred to as a PDCCH search space. For example, in the LTE system, the PDCCH search space is defined as shown in Table 1.

TABLE 1

| Type | Search space $S_k^{(L)}$ | | Number of PDCCH candidates $M^{(L)}$ | DCI formats |
|---|---|---|---|---|
| | Aggregation level L | Size (in CCEs) | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

L denotes the number of CCEs configuring the PDCCH, $S_k^{(L)}$ denotes the PDCCH search space, and $M^{(L)}$ denotes the number of PDCCH candidates to be monitored in the search space.

The PDCCH search space may be divided into a specific search space in which access is allowed for only a specific UE and a common search space in which access is allowed for all UEs within a cell. The UE monitors the common search space at L=4 and 8 and monitors the specific search space at L=1, 2, 4 and 8. The common search space and the specific search space may overlap each other.

Various example methods relating to power control of a control channel, such as the PDCCH, will now be described with respect to FIGS. 8A-9.

Figure 8A:
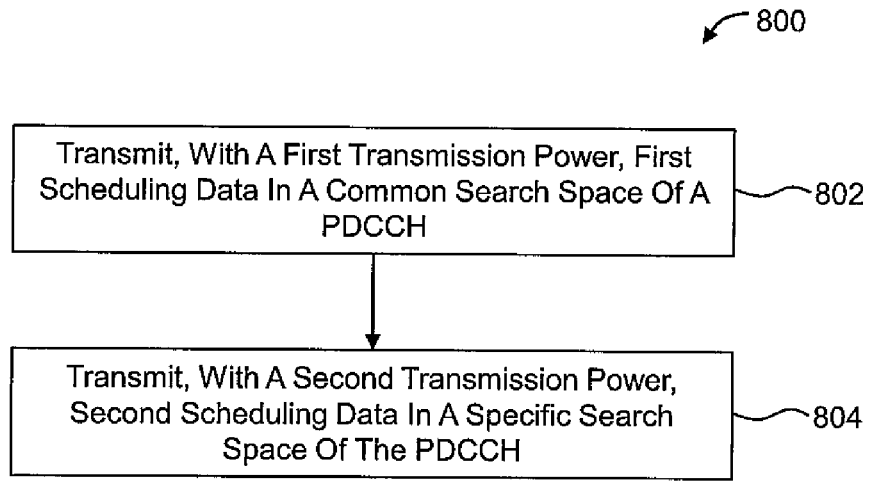
FIG. 8A shows an example flow diagram of a method for power control of control channels in a radio communication system.

FIG. 8A shows an example flow diagram of a method 800 for power control of control channels in a radio communication system, arranged in accordance with at least some embodiments described herein. The method 800 may be performed in whole or in part by, e.g., one of the base stations 102 of FIG. 1 and/or the base station 200 of FIG. 2. The method 800 includes various operations, functions or actions as illustrated by one or more of blocks 802 and/or 804. The method 800 may begin at block 802.

In block 802, ["Transmit, With A First Transmission Power, First Scheduling Data In A Common Search Space Of A PDCCH"], first scheduling data in a common search space of a PDCCH is transmitted with a first transmission power. The first scheduling data may include, but is not limited to, System Information Block (SIB) and/or paging information. In some embodiments, the first scheduling data is transmitted with the first transmission power by one or more of the transmitters included in the transceivers 208A-208N of the base station 200 of FIG. 2, and/or by one or more of the antennas 210A-210N. Block 802 may be followed by block 804.

In block 804, ["Transmit, With A Second Transmission Power, Second Scheduling Data In A Specific Search Space Of The PDCCH"], second scheduling data in a specific search space of the PDCCH is transmitted with a second transmission power. The second scheduling data may include, but is not limited to, traffic data or other scheduling data associated with a specific UE. In some embodiments, the second scheduling data is transmitted with the second transmission power by one or more of the transmitters included in the transceivers 208A-208N of the base station 200 FIG. 2, and/or by one or more of the antennas 210A-210N.

Some embodiments disclosed herein include a computer-readable storage medium having computer-executable instructions stored thereon that are executable by a computing device to perform operations included in the method 800 of FIG. 8A, such as the operations illustrated by blocks 802, and/or 804 in FIG. 8A, and/or variations thereof. In these and other embodiments, the computing device may be included in the base station. For instance, the computing device may include the processor 212 included in the base station 200 of FIG. 2. Alternately or additionally, the computer-readable storage medium may include the memory 214 included in the base station 200 of FIG. 2.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 800 of FIG. 8A may further include determining a magnitude of the first transmission power based on one or more first criteria. Additional details regarding an example method for determining a magnitude of the first transmission power are discussed below with respect to FIG. 9. The one or more first criteria may include at least one of: an environment of the base station, a coverage radius of the base station, or a coverage requirement of the base station.

Alternately or additionally, the method 800 of FIG. 8A may further include determining a magnitude $P_i$ of the second transmission power based on one or more second criteria independent from the first criteria. The one or more second criteria may include a CQI received from the specific UE with which the second scheduling data is associated. In these and other embodiments, the method 800 may further include receiving the CQI from the UE. For instance, the CQI may be received by one or more of the receivers included in the transceivers 208A-208N of the base station 200 of FIG. 2, and/or by one or more of the antennas 210A-210N. Alternately or additionally, the magnitude $P_i$ of the second transmission power may be inversely proportional to a magnitude of the CQI received from the UE.

In some embodiments, the CQI is routinely transmitted by UEs within a cell to a corresponding base station. In the LTE system, a CQI can be any one of 16 possible grades, including any one of the integers ranging from 0 to 15. More generally, possible magnitudes for the CQI may include $CQI_0$, $CQI_1$, $CQI_2, \ldots, CQI_L$, where $CQI_{i-1} < CQI_i$ for $i=1, 2, \ldots, L$. A relatively higher CQI grade may indicate a relatively higher wireless channel quality, while a relatively lower CQI grade may indicate a relatively lower wireless channel quality between the base station and the corresponding UE.

The possible CQI grades can be divided into L different sets $S_i$ including:

$S_1: CQI \epsilon [CQI_0, CQI_1)$;

$S_2: CQI \epsilon [CQI_1, CQI_2)$;

...

$S_L: CQI \epsilon [CQI_{L-1}, CQI_L]$.

In these and other embodiments, determining a magnitude $P_i$ of the second transmission power may include assigning the received CQI to one of the L different sets $S_i$ according to the definitions set forth above and then selecting a corresponding magnitude $P_i$ of the second transmission power from a set of values including the set $\{P_1, P_2, \ldots, P_L\}$ where $P_{i-1} > P_i$.

Thus, the higher the CQI received from the UE, the lower the determined magnitude $P_i$ for the second transmission power. For example, if the CQI received from the UE is the highest CQI, $CQI_L$, then the CQI received from the UE will be assigned to the set $S_L$, followed by selection of the corresponding value $P_L$ from the set $\{P_1, P_2, \ldots, P_L\}$, where the value $P_L$ is the lowest value in the set $\{P_1, P_2, \ldots, P_L\}$.

Stated another way, the lower the CQI received from the UE, the higher the determined magnitude $P_i$ for the second transmission power. For example, if the CQI received from the UE is the lowest CQI, $CQI_0$, then the CQI received from the UE will be assigned to the set $S_1$, followed by selection of the corresponding value $P_1$ from the set $\{P_1, P_2, \ldots, P_L\}$, where the value $P_1$ is the highest value in the set $\{P_1, P_2, \ldots, P_L\}$.

Although not required, the values in the set $\{P_1, P_2, \ldots, P_L\}$ may be spaced apart from each other by about 2 dBm. More generally, in some embodiments, a spacing between the values in the set $\{P_1, P_2, \ldots, P_L\}$ may be in a range from greater than 0 dBm to about 4 dBm, or in a range from about 1 dBm to about 3 dBm. Alternately or additionally, the highest value $P_1$ may be about 40 dBm, and/or the lowest value $P_L$ may be about 25 dBm. More generally, the highest value $P_1$ may be in a range from about 30 dBm to about 50 dBm, or in a range from about 35 dBm to about 45 dBm, and/or the lowest value $P_L$ may be in a range from about 15 dBm to about 35 dBm, or in a range from about 20 dBm to about 30 dBm.

In these and other embodiments, the received CQI may be a first CQI and the method 800 of FIG. 8A may further include receiving, from the UE, a second CQI that is greater than the first CQI and decreasing the second transmission power in response thereto. Alternately or additionally, the method 800 of FIG. 8A may further include receiving, from the UE, a second CQI that is less than the first CQI and increasing the second transmission power in response thereto.

Figure 8B:
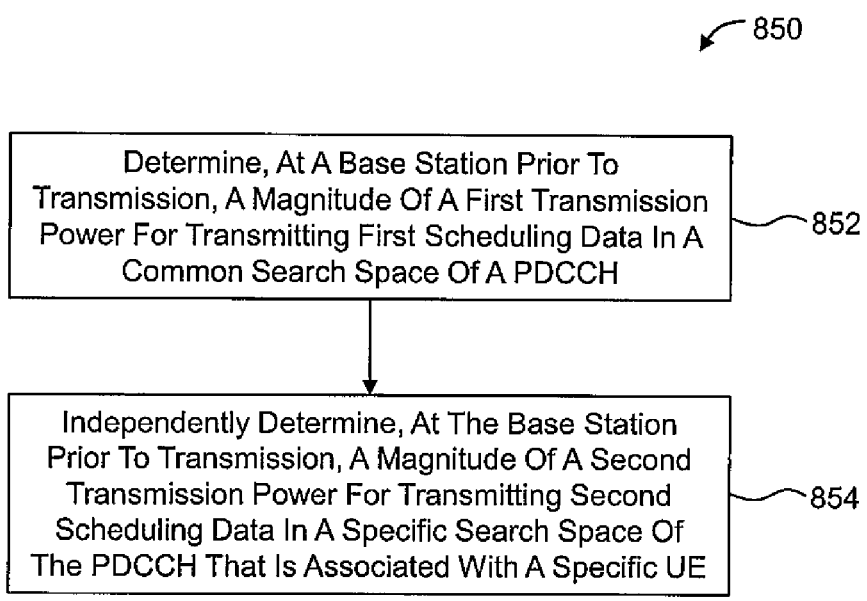
FIG. 8B shows an example flow diagram of another method for power control of control channels in a radio communication system.

FIG. 8B shows an example flow diagram of another method 850 for power control of control channels in a radio communication system, arranged in accordance with at least some embodiments described herein. The method 850 may be performed in whole or in part by, e.g., one of the base stations 102 of FIG. 1 and/or the base station 200 of FIG. 2. More particularly, the method 850 may be performed by the processor 212 and/or other components of the base station 200 of FIG. 2. The method 850 includes various operations, functions or actions as illustrated by one or more of blocks 852 and/or 854. The method 850 may begin at block 852.

In block 852, ["Determine, At A Base Station Prior To Transmission, A Magnitude Of A First Transmission Power For Transmitting First Scheduling Data In A Common Search Space Of A PDCCH"], a magnitude of a first transmission power for transmitting first scheduling data in a common search space of a PDCCH is determined at the base station prior to transmission. As above, the first scheduling data may include, but is not limited to, SIB and/or paging information. In some embodiments, the magnitude of the first transmission power is determined by the processor 212 of the base station 200 of FIG. 2. Alternately or additionally, the determination of the magnitude of the first transmission power may be based on at least one of: an environment of the base station, a coverage radius of the base station, or a coverage requirement of the base station. Additional details regarding an example method for determining a magnitude of the first transmission power are discussed below with respect to FIG. 9. Block 852 may be followed by block 854.

In block 854, ["Independently Determine, At The Base Station Prior To Transmission, A Magnitude Of A Second Transmission Power For Transmitting Second Scheduling Data In A Specific Search Space Of The PDCCH That Is Associated With A Specific UE"], a magnitude of a second transmission power for transmitting second scheduling data in a specific search space of the PDCCH that is associated with a specific UE is determined at the base station prior to transmission. As above, the second scheduling data may include, but is not limited to, traffic data or other scheduling data associated with the specific UE. In some embodiments, the magnitude of the second transmission power is determined by the processor 212 of the base station 200 of FIG. 2. Alternately or additionally, the determination of the magnitude of the second transmission power may be based on a CQI received from the specific UE.

Some embodiments disclosed herein include a computer-readable storage medium having computer-executable instructions stored thereon that are executable by a computing device to perform operations included in the method 850 of FIG. 8B, such as the operations illustrated by blocks 802, and/or 804 in FIG. 8A, and/or variations thereof. In these and other embodiments, the computing device may be included in the base station. For instance, the computing device may include the processor 212 included in the base station 200 of FIG. 2. Alternately or additionally, the computer-readable storage medium may include the memory 214 included in the base station 200 of FIG. 2.

Although not shown, the method 850 of FIG. 8B may further include receiving a CQI from the specific UE. For example, the CQI may be received by one or more of the receivers included in the transceivers 208A-208N of the base station 200 of FIG. 2, and/or by one or more of the antennas 210A-210N. As explained above, possible magnitudes for the CQI may include $CQI_0$, $CQI_1$, $CQI_2, \ldots, CQI_L$, where $CQI_{i-1} < CQI_i$ for i=1, 2, ..., L. In these and other embodiments, a relatively higher CQI grade may indicate a relatively higher wireless channel quality, while a relatively lower CQI grade may indicate a relatively lower wireless channel quality between the base station and the specific UE.

Optionally, determining a magnitude of the second transmission power in block 854 may include assigning the CQI received from the specific UE to a set Si according to the definitions set forth above, and then selecting, for the assigned set $S_i$, a corresponding magnitude $P_i$ of the second transmission power from the set of values include $\{P_1, P_2, \ldots, P_L\}$ where $P_{i-1} > P_i$, as already explained above with respect to FIG. 8A.

In these and other embodiments, the received CQI may be a first CQI received at a first time and the method 850 of FIG. 8B may further include receiving, from the UE, a second CQI that is greater than the first CQI at a second time and decreasing the second transmission power in response thereto. Alternately or additionally, the method 850 of FIG. 8B may further include receiving, from the UE, a second CQI that is less than the first CQI and increasing the second transmission power in response thereto.

Figure 9:
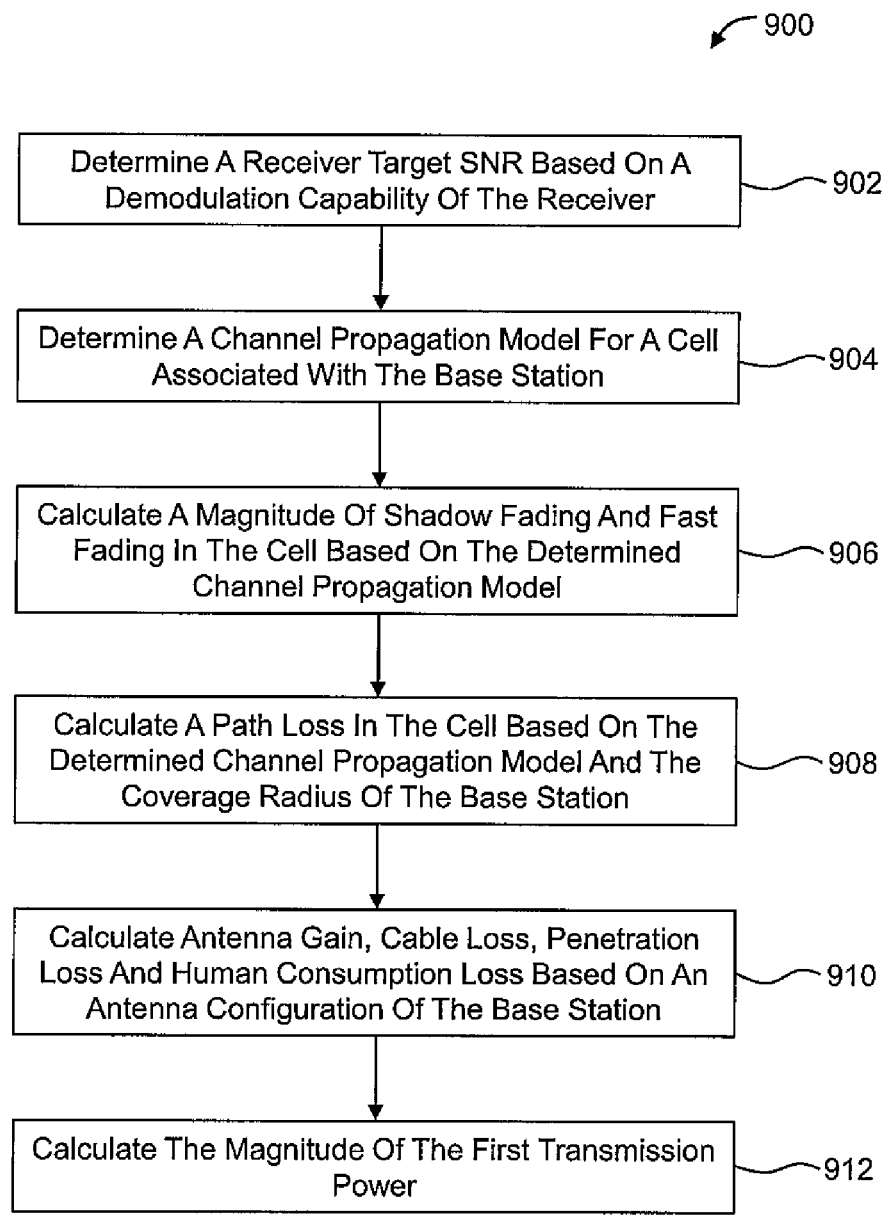
FIG. 9 shows an example flow diagram of a method for determining a magnitude of a transmission power for data in a common search space of a PDCCH, all arranged in accordance with at least some embodiments described herein.

FIG. 9 shows an example flow diagram of a method 900 for determining a magnitude of a transmission power for data in a common search space of a PDCCH, arranged in accordance with at least some embodiments described herein. The method 900 may be performed in whole or in part by, e.g., one of the base stations 102 of FIG. 1 and/or the base station 200 of FIG. 2. The method 900 includes various operations, functions or actions as illustrated by one or more of blocks 902, 904, 906, 908, 910, and/or 912. The method 900 may begin at block 902.

In block 902, ["Determine a Receiver Target SNR Based On A Demodulation Capability Of The Receiver"], a receiver target signal to noise ratio (SNR) is determined based on a demodulation capability of the receiver. Block 902 may be followed by block 904.

In block 904, ["Determine A Channel Propagation Model For A Cell Associated With The Base Station"], a channel propagation model for a cell associated with the base station is determined. Block 904 may be followed by bock 906.

In block 906, ["Calculate A Magnitude Of Shadow Fading And Fast Fading In The Cell Based On The Determined Channel Propagation Model"], a magnitude of shadow fading and fast fading in the cell is calculated based on the determined channel propagation model. Block 906 may be followed by block 908.

In block 908, ["Calculate A Path Loss In The Cell Based On The Determined Channel Propagation Model And The Coverage Radius Of The Base Station"], a path loss in the cell is calculated based on the determined channel propagation model and the coverage radius of the base station. Block 908 may be followed by block 910.

In block 910, ["Calculate Antenna Gain, Cable Loss, Penetration Loss And Human Consumption Loss Based On An Antenna Configuration Of The Base Station"], antenna gain, cable loss, penetration loss and human consumption loss are calculated based on an antenna configuration of the base station. Block 910 may be followed by block 912.

In block 912, ["Calculate The Magnitude Of The First Transmission Power"], the magnitude of the first transmission power is calculated. In some embodiments, the magnitude of the first transmission power is calculated according to the following formula:

$$P = SNR + \text{shadow fading} + \text{fast fading} + \text{path loss} - \text{antenna gain} + \text{cable loss} + \text{penetration loss} + \text{human consumption loss} + \text{noise},$$

where P is the calculated magnitude of the first transmission power, noise includes thermal noise and a noise figure, thermal noise is a constant, and the noise figure is between 3-8 decibels.

Thus, according to some embodiments described herein, a base station can select different transmission powers for the common search space of the PDCCH and the specific search space of the PDCCH. Moreover, the transmission power for the specific search space of the PDCCH can be selected appropriately based on the channel quality between the corresponding UE and the base station. As such, strong PDCCH interference between neighboring cells can be reduced and the success rate of UEs to decode the PDCCH can be improved in some embodiments. Accordingly, system resource utilization and user satisfaction may be improved by practicing some of the embodiments described herein.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for power control of control channels in a radio communication system comprising:
   transmitting, with a first transmission power, first scheduling data in a common search space of a Physical Downlink Control Channel (PDCCH);
   transmitting, with a second transmission power, second scheduling data in a specific search space of the PDCCH;
   determining a magnitude of the first transmission power of the first scheduling data in the common search space of the PDCCH based on one or more first criteria; and
   determining a magnitude $P_i$ of the second transmission power of the second scheduling data in the specific search space of the PDCCH based on one or more second criteria independent from the first criteria.

2. The method of claim 1, wherein a base station is configured to transmit the first and second scheduling data, further wherein the one or more first criteria include at least one of: an environment of the base station, a coverage radius of the base station, or a coverage requirement of the base station.

3. The method of claim 2, wherein determining the magnitude of the first transmission power includes:
   determining a receiver target signal to noise ratio (SNR) based on a demodulation capability of the receiver;
   determining a channel propagation model for a cell associated with the base station;
   calculating a magnitude of shadow fading and fast fading in the cell based on the determined channel propagation model;
   calculating a path loss in the cell based on the determined channel propagation model and the coverage radius of the base station;
   calculating antenna gain, cable loss, penetration loss and human consumption loss based on an antenna configuration of the base station; and
   calculating the magnitude of the first transmission power according to the following formula:

$P$=SNR+shadow fading+fast fading+path loss−antenna gain+cable loss+penetration loss+human consumption loss+noise, where P is the calculated magnitude of the first transmission power, noise includes thermal noise and a noise figure, thermal noise is a constant, and the noise figure is between 3-8 decibels.

4. The method of claim 1, further comprising receiving a Channel Quality Indicator (CQI) from a specific user equipment (UE) with which the second scheduling data is associated, wherein the one or more second criteria include the received CQI.

5. The method of claim 4, wherein the UE comprises a mobile phone, a smartphone, or a laptop computer.

6. The method of claim 4, wherein the magnitude $P_i$ of the second transmission power is inversely proportional to a magnitude of the received CQI.

7. The method of claim 6, wherein:
   possible magnitudes of the received CQI include $CQI_0$, $CQI_1$, $CQI_2$, ..., $CQI_L$, where $CQI_{i-1} < CQI_i$ for i=1, 2, ..., L; and
   determining the magnitude $P_i$ of the second transmission power includes:
      assigning the received CQI to a set $S_i$ according to the following definitions:

$S_1$:CQI∈[$CQI_0$,$CQI_1$);

$S_2$:CQI∈[$CQI_1$,$CQI_2$);

...

$S_L$:CQI∈[$CQI_{L-1}$,$CQI_L$]; and selecting, for the assigned set $S_i$, a corresponding magnitude $P_i$ of the second transmission power from a set $\{P_1, P_2, ..., P_L\}$ where $P_{i-1} > P_i$.

8. The method of claim 4, wherein the received CQI is a first received CQI, the method further comprising:
   receiving, from the UE, a second CQI that is greater than the first CQI; and
   decreasing the second transmission power.

9. The method of claim 4, wherein the received CQI is a first received CQI, the method further comprising:
   receiving, from the UE, a second CQI that is less than the first CQI; and
   increasing the second transmission power.

10. The method of claim 1, wherein the first scheduling data includes at least one of System Information Block (SIB) or paging information.

11. The method of claim 1, wherein the second scheduling data includes traffic data associated with a specific user equipment (UE).

12. A computer-readable storage medium having computer-executable instructions stored thereon that are executable by a computing device to perform operations comprising:
   determining, at a base station prior to transmission, a magnitude of a first transmission power for transmitting first scheduling data in a common search space of a Physical Downlink Control Channel (PDCCH); and
   independently determining, at the base station prior to transmission, a magnitude of a second transmission power for transmitting second scheduling data in a specific search space of the PDCCH that is associated with a specific user equipment (UE).

13. The computer-readable storage medium of claim 12, wherein the determination of the magnitude of the first transmission power is based on at least one of: an environment of the base station, a coverage radius of the base station, or a coverage requirement of the base station, and wherein the determination of the magnitude of the second transmission power is based on a Channel Quality Indicator (CQI) received from the specific UE.

14. The computer-readable storage medium of claim 12, wherein determining the magnitude of the first transmission power includes:
   determining a receiver target signal to noise ratio (SNR) based on a demodulation capability of the receiver;
   determining a channel propagation model for a cell associated with the base station;
   calculating a magnitude of shadow fading and fast fading in the cell based on the determined channel propagation model;
   calculating a path loss in the cell based on the determined channel propagation model and the coverage radius of the base station;
   calculating antenna gain, cable loss, penetration loss and human consumption loss based on an antenna configuration of the base station; and
   calculating the magnitude of the first transmission power according to the following formula:

$P=$SNR+shadow fading+fast fading+path loss−antenna gain+cable loss+penetration loss+human consumption loss+noise, where P is the calculated magnitude of the first transmission power, noise includes thermal noise and a noise figure, thermal noise is a constant, and the noise figure is between 3-8 decibels.

15. The computer-readable storage medium of claim 12, wherein the computer-executable instructions are executable by a computing device to perform further operations comprising receiving a first Channel Quality Indicator (CQI) reported by the specific UE.

16. The computer-readable storage medium of claim 15, wherein:
   possible magnitudes of the first CQI include $CQI_0$, $CQI_1$, $CQI_2$, ..., $CQI_L$, where $CQI_{i-1}<CQI_i$ for i=1, 2, ..., L; and
   determining the magnitude $P_i$ of the second transmission power includes:
      assigning the received CQI to a set $S_i$ according to the following definitions:

$S_1$:CQI∈[$CQI_0$,$CQI_1$);

$S_2$:CQI∈[$CQI_1$,$CQI_2$);

...

$S_L$:CQI∈[$CQI_{L-1}$,$CQI_L$]; and selecting, for the assigned set $S_i$, a corresponding magnitude $P_i$ of the second transmission power from a set $\{P_1, P_2, ..., P_L\}$ where $P_{i-1}>P_i$.

17. The computer-readable storage medium of claim 15, wherein the computer-executable instructions are executable by a computing device to perform further operations comprising:
   receiving a second CQI reported by the specific UE, wherein the second CQI is greater than the first CQI; and
   decreasing the second transmission power.

18. The computer-readable storage medium of claim 15, wherein the computer-executable instructions are executable by a computing device to perform further operations comprising:
   receiving a second CQI reported by the specific UE, wherein the second CQI is less than the first CQI; and
   increasing the second transmission power.

19. A base station comprising:
   at least one transmitter;
   a computing device; and
   a computer-readable storage medium having computer-executable instructions stored thereon that are executable by a computing device to perform operations comprising:
      determining, prior to transmission using the at least one transmitter, a magnitude of a first transmission power for transmitting first scheduling data in a common search space of a Physical Downlink Control Channel (PDCCH); and
      independently determining, prior to transmission using the at least one transmitter, a magnitude of a second transmission power for transmitting second scheduling data in a specific search space of the PDCCH that is associated with a specific user equipment (UE).

20. The base station of claim 19, wherein the at least one transmitter is configured to:
   transmit, with the first transmission power, the first scheduling data in the common search space of the PDCCH; and
   transmit, with the second transmission power, the second scheduling data in the specific search space of the PDCCH that is associated with the specific UE.

21. The base station of claim 19, further comprising a receiver.

22. The base station of claim 21, wherein:
   the receiver is configured to receive a Channel Quality Indicator (CQI) from the specific UE; and
   the determination of the second transmission power is based on a magnitude of the CQI.

23. The base station of claim 19, wherein a magnitude of the second transmission power is determined, at a first time, to be a first value based on a first Channel Quality Indicator (CQI) reported by the specific UE, and a magnitude of the second transmission power is determined, at a second time, to be a second value greater than the first value based on a second CQI reported by the specific UE, wherein the second CQI is less than the first CQI.

24. The base station of claim 19, wherein the UE comprises a mobile phone, a smartphone, or a laptop computer.

* * * * *

UNITED STATES PATENT AND TRADEMARK OFFICE
CERTIFICATE OF CORRECTION

PATENT NO. : 8,958,839 B2  Page 1 of 1
APPLICATION NO. : 13/318391
DATED : February 17, 2015
INVENTOR(S) : Huang It is certified that error appears in the above-identified patent and that said Letters Patent is hereby corrected as shown below:

In the Specification

In Column 3, Line 57, delete "pica" and insert -- pico --, therefor.

In Column 7, Line 34, delete "(HACK)," and insert -- (NACK), --, therefor.

In Column 7, Line 46, delete "1.0" and insert -- 10 --, therefor.

In Column 9, Line 12, delete "LTEs" and insert -- UEs --, therefor.

In the Claims

In Column 16, Line 45, in Claim 7, delete "claim 6," and insert -- claim 4, --, therefor.

Signed and Sealed this
Twenty-eighth Day of July, 2015

Michelle K. Lee
*Director of the United States Patent and Trademark Office*